United States Patent [19]
Carter

[11] 3,762,048
[45] Oct. 2, 1973

[54] STEM CUTTING AND RETAINING TOOL

[75] Inventor: Ronald David Carter, Leamington Spa, England

[73] Assignee: The Stanley Works, New Britain, Conn.

[22] Filed: Apr. 7, 1971

[21] Appl. No.: 131,875

[30] Foreign Application Priority Data
June 29, 1970  Great Britain .................. 31,368/70

[52] U.S. Cl. .................................................. 30/124
[51] Int. Cl. ............................................. B26b 17/04
[58] Field of Search ...................... 30/124, 134, 135

[56] References Cited
UNITED STATES PATENTS

| | | | |
|---|---|---|---|
| 208,046 | 9/1878 | Snediker | 30/135 |
| 778,140 | 12/1904 | Paff | 30/134 |
| 1,775,086 | 9/1930 | Bonehill | 30/134 |
| 2,320,460 | 6/1943 | Muller | 30/134 |
| 2,938,266 | 5/1960 | Klein | 30/124 |

FOREIGN PATENTS OR APPLICATIONS

| | | | |
|---|---|---|---|
| 37,710 | 10/1914 | Sweden | 30/135 |

Primary Examiner—James L. Jones, Jr.
Assistant Examiner—J. C. Peters
Attorney—Prutzman, Hayes, Kalb & Chilton

[57] ABSTRACT

A stem cutting and retaining tool particularly useful as a flower shear in which a pair of pivoted handles having shearing means at their forward ends including a blade, is provided with a cantilever arm extending along the blade, the cantilever arm being supported by a parti-coil spring secured at one end to the inner end of the cantilever arm and secured at its other end to the handle. The cantilever arm may be provided with a shield at its forward end covering the forward end of the blade and the cantilever arm and parti-coil spring may be formed as a unitary structure of plastic material.

12 Claims, 4 Drawing Figures

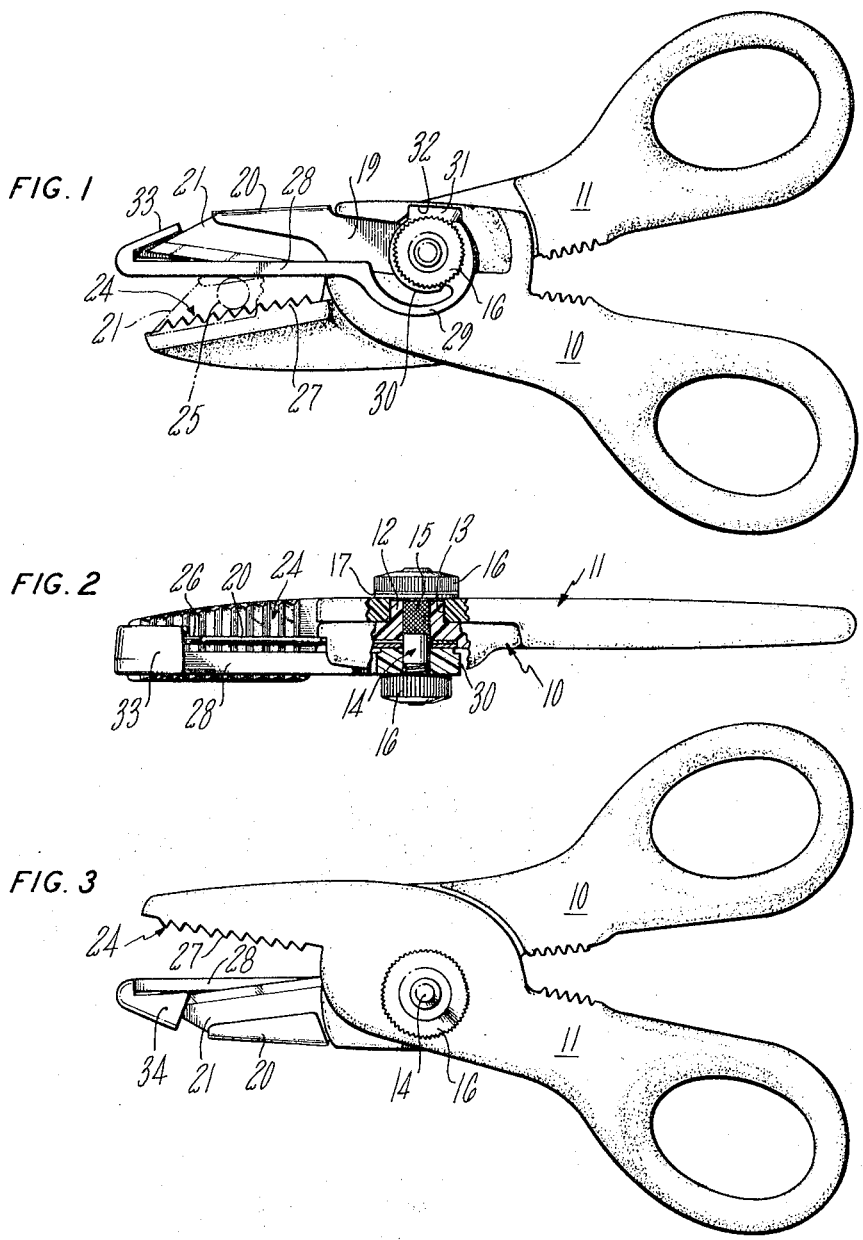

INVENTOR
RONALD DAVID CARTER
BY Prutzman, Hayes, Kalb and Chilton
ATTORNEYS

STEM CUTTING AND RETAINING TOOL

The present invention relates to stem cutting tools of the type having means for holding the stem which has been cut until the stem is intentionally released. Such tools have particular usefulness as a flower shear or the like because it permits the user to sever the stem or branch and secure the severed part in a one-handed operation, leaving the other hand free for support or other assistance.

An object of the invention is to provide stem holding means for use in combination with a pair of shears which is of simplified design and yet of increased effectiveness for the intended purpose of adequately securing a stem or branch while it is severed and retaining it after severance until intentionally released.

A further object of the invention is to provide such stem holding means which is attractive in design and which will enhance rather than detract from the appearance of the shears and which is of relatively small size and mounted in such a way that it does not interfere with the normal operation of the shears nor materially add to the size or weight of the shears.

Another object is to provide stem holding means which is inexpensive to manufacture and assemble and which can be incorporated with a pair of shears at little increase in cost but which is also durable providing a long service life.

A further object is to provide such stem holding means which is free of frictionally operating parts so that the operation thereof will not be affected by moisture or corrosion or other adverse conditions of operation and the efficiency of operation will be maintained over long periods of use.

Another object is to provide a stem holding means incorporating safety features whereby it affords a useful protective function in addition to that of holding the severed stem or stalk.

Other objects will be in part obvious and in part pointed out more in detail hereinafter.

A better understanding of the invention will be obtained from the following detailed description and the accompanying drawings showing an illustrative application of the invention.

In the drawings:

FIG. 1 is a side view of a pair of shears on which is mounted a stem retaining device embodying the present invention, the stem or branch being severed being shown in dotted lines and the blade at the completion of a cutting operation also being shown in dotted lines;

FIG. 2 is a top view of the pair of shears and stem retaining device with a portion thereof in cross section;

FIG. 3 is a rear view thereof; and

Figure 4:
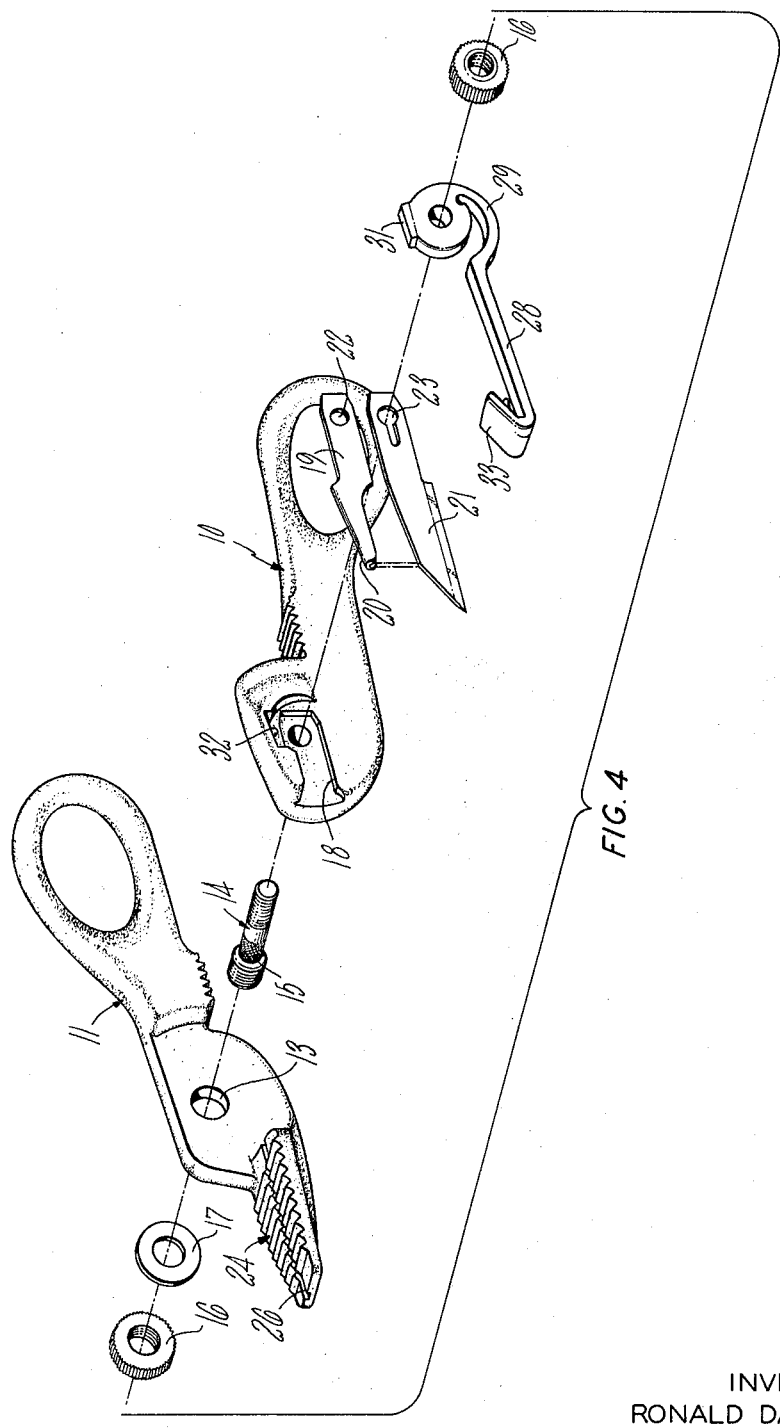
FIG. 4 is an exploded perspective view thereof.

Referring to the drawings in detail, the pair of shears shown therein comprises a pair of handles 10 and 11 which in the preferred embodiment are molded of plastic material. Handle 10 is provided with an integral hub 12 which engages in the hole 13 of handle 11 to form a pivot for the assembly. The assembly is held together by a stud 14 having a knurled intermediate section 15 fixed in the hub 12 and having threaded ends on which are received the knurled nuts 16 and antifriction washer 17.

The forward end of handle 10 is formed with a slot 18 in which is received an elongated blade holder and support 19 in the form of a metal strip having a folded over end portion 20 in which is received a replaceable blade 21. The shanks of the holder 19 and blade 21 and slot 18 are dimensioned to have a reasonably close fit so that the blade holder and blade are effectively prevented from pivoting relative to the handle 10. The shanks are also apertured as shown at 22 and 23 to accommodate the stud 14 by means of which they are restrained from longitudinal movement relative to the handle 10.

Formed integrally on the forward end of handle 11 is a jaw 24 forming a relatively wide toothed supporting surface or anvil upon which the stem or branch to be cut is placed as indicated in phantom at 25 and against which the edge of blade 21 engages in a cutting operation. A thin slot 26 in the face of the jaw 24 is provided to receive the edge of blade 21 upon full cutting movement of the blade 21 relative to the jaw 24. It will be noted that the integrally formed teeth 27 having a more acute rake angle at the sides facing the pivot 12 thus increasing the resistance to push-out of the stem or branch 25 during the cutting operation.

The stem holding and retaining device formed in accordance with the invention comprises a relatively stiff cantilever arm 28 connected by a parti-coil spring 29 to the handle 10. In the preferred embodiment the spring 29 is connected to the handle 10 by means of a boss 30 which is apertured to fit over the stud 14 and has a tab 31 which is received in a notch 32 in the handle 10 located at the inner end of the slot 18. As will be appreciated the interengagement of the tab 31 and notch 32 effectively prevents any turning movement of the boss 30 relative to the handle 10 and the boss 30 supports the inner end of the parti-coil spring 29. Also, in the preferred embodiment the cantilever arm 28, parti-coil spring 29 and boss 30 may be fabricated as a single integral and unitary piece formed of plastic material.

The forward end of the cantilever arm 28 may be formed with a wide upwardly and rearwardly projecting lip 33 intended to extend about the forward tip of the blade 21 and also having a flange 34 along its one edge extending parallel to the blade 21. The lip 33 serves several functions, one being that it encompasses the forward tip of blade 21 as a shield or guard thus permitting the use of even a very sharply pointed blade 21 with complete safety. The other function is that in the at-rest condition of the holder, the lip 33 engages against the upper edge of the blade 21 thus limiting movement of the cantilever arm relative to the blade in a cutting direction and normally positioning it just slightly ahead of the cutting edge of the blade. As will be appreciated, this relative position is maintained even though the parti-coil spring 29 is dimensioned so that it is pre-loaded when the cantilever arm 28 is in this position. However, it will also be appreciated that the lip or shield 33 in no way interferes with the reverse or clockwise movement of the arm 28 relative to the blade 21 as viewed in FIG. 1 which movement is necessary during a cutting operation. The lip or shield 33 also effectively prevents the user from inadvertently placing the stem or stalk to be cut between the blade and holder arm instead of between both of them and the jaw 24 as required for proper operation of the tool. Also, because the arm 28 extends along one side of the blade and the flange 34 depends downwardly along the other side of the blade, lateral movement of the arm is effectively limited.

It is believed that the operation and advantages of the device of the present invention will be apparent from the foregoing description and the following additional explanation. As indicated in FIG. 1, the cantilever arm 28 is normally slightly ahead of the cutting edge of the blade 21 so that during a cutting operation the cantilever arm 28 first engages the stem or branch 25. When engagement with the stem or branch occurs, further movement of the cantilever arm 28 is prevented and, while it continues to press against the stem or branch, the blade 21 continues its movement to the full cutting position shown in phantom at which time the stem or branch is completely severed. Because of the force applied by the parti-coil spring 29 the cantilever arm 28 presses the severed stem or branch against the jaw 24 and effectively retains it until it is intentionally released by returning the handles to the original position shown in FIG. 1.

Even though the cantilever arm 28 and parti-coil spring 29 may be formed as a unitary member of plastic material of substantially uniform cross-sectional dimensions, nonetheless substantially all bending takes place in the parti-coil spring section 29 and no material flexing of the cantilever arm portion 28 takes place. As a result, there is little tendency for the stem or branch to be pushed outwardly of the jaw 24 and, in fact, because of the flexing of the parti-coil spring 29 there is a slight draw-in of the cantilever arm 28 during cutting which further operates to overcome any tendency of the stem or branch to be cammed outwardly as a result of the cutting operation.

As described above, the present invention can be applied to pruning shears or similar cutting devices at little increase in cost in view of the ease of fabrication and assembly, particularly when the stem holding and retaining portion is formed as a single unit of plastic material. The stem holder and retainer adds little to the weight or size of the tool and does not detract from its appearance nor interfere with the normal use of the tool. It adds no frictionally operating parts to the assembly which might interfere with the service life of the tool and, in addition, it may afford the additional safety feature of guarding the forward end of the blade thus contributing to the safe and proper use of the tool.

As will be apparent to persons skilled in the art, various modifications, adaptations and variations of the foregoing specific disclosure can be made without departing from the teachings of the present invention.

I claim:

1. In combination with a pair of shears comprising coactive handle members, a pivot joint therebetween, and a blade on at least one of said handles, stem retaining means comprising a relatively rigid cantilever arm extending generally parallel to said blade for engagement with a surface on the other of said handles, the blade and said one of said handles being formed to provide a clearance between them and the entire length of the arm to permit relative movement of the entire arm with respect to the blade, and a spring supporting the arm on said one of said handles for movement relative to the blade, said spring being connected at one end to the end of the arm nearest the pivot joint and being fixed at its other end to said one of said handles.

2. The combination set forth in claim 1 wherein the spring is a parti-coil spring.

3. The combination set forth in claim 2 wherein said other end of the spring is attached to a hub which is secured to said one of said handles at the pivot joint.

4. The combination set forth in claim 3 wherein the cantilever arm, parti-coil spring and hub are formed as a single unit of plastic material.

5. The combination set forth in claim 1 wherein the cantilever arm at its end farthest from the pivot joint is provided with a projection extending around the outer end of the blade.

6. The combination set forth in claim 5 wherein the parts are dimensioned so that the projection on the cantilever arm extends around and engages the forward end of the blade and the spring is pre-loaded in the normal at-rest condition of the tool.

7. The combination set forth in claim 2 wherein the other of said handles is provided with a relatively wide supporting surface upon which the object to be cut rests while it is subjected to the action of the blade, said surface being in the path of movement of the blade and cantilever arm.

8. The combination set forth in claim 7 wherein said supporting surface is a toothed surface having a longitudinal groove therein for receiving the edge of the blade, the toothed surface being disposed along both sides of the groove.

9. The combination set forth in claim 5 wherein the projection on the cantilever arm has a side flange extending parallel to the blade on the side opposite from the cantilever arm.

10. The combination set forth in claim 4 wherein the hub has a tab positioned in a notch of the said one of said handles to prevent relative rotation thereof.

11. The combination set forth in claim 4 wherein the end of the cantilever arm remote from the spring has an integral upwardly and rearwardly extending projection of increased width for extension about the outer end of the blade.

12. The combination set forth in claim 7 wherein the cantilever arm and the parti-coil spring are formed as a single unit of plastic material and the spring terminates in a hub secured to said one of said handles in the region of the pivot joint.

* * * * *